April 5, 1949.                G. BODINAUX ET AL                2,466,363
                 AUTOMATIC REGULATION DEVICE FOR TRANSMISSION
                   MECHANISMS, SPECIALLY FOR BRAKES CONTROL
Filed March 6, 1947                                     2 Sheets-Sheet 1

Gaston Bodinaux
Armand Malchair
INVENTORS

PER
ATTORNEYS

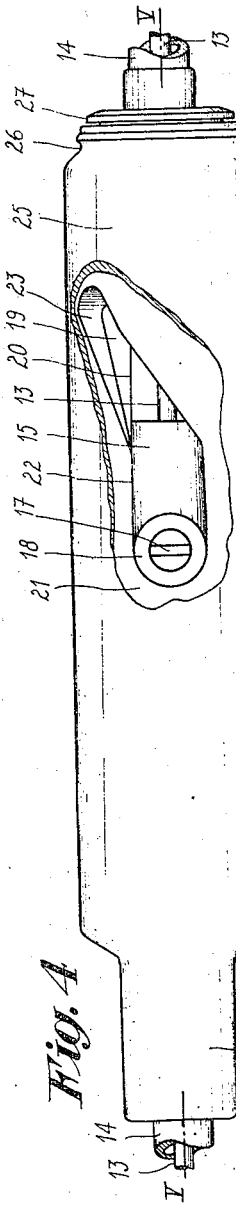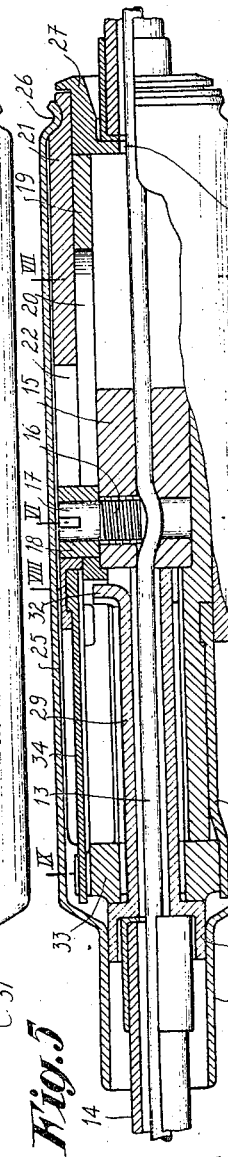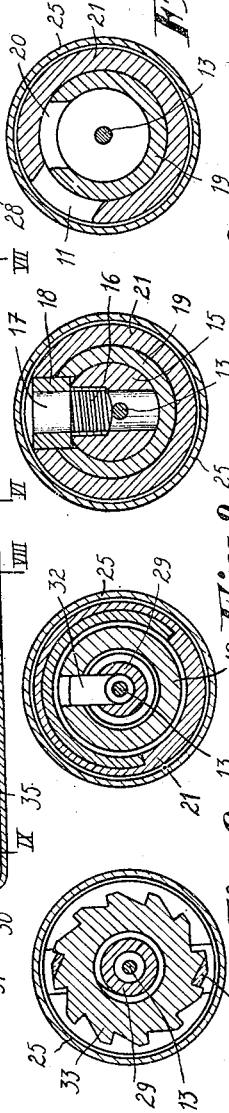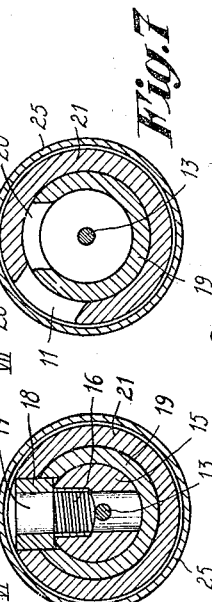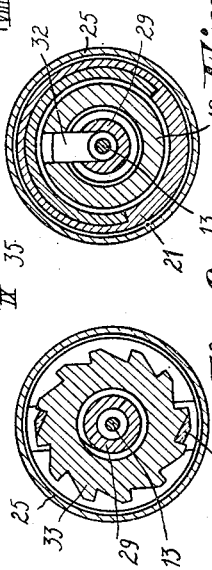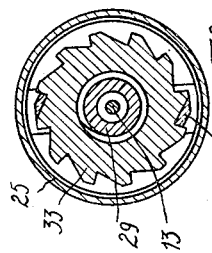

Patented Apr. 5, 1949

2,466,363

UNITED STATES PATENT OFFICE 2,466,363

AUTOMATIC REGULATION DEVICE FOR TRANSMISSION MECHANISMS, SPECIALLY FOR BRAKES CONTROL

Gaston Bodinaux, Liege, and Armand Malchair, Herstal, Belgium

Application March 6, 1947, Serial No. 732,787
In Belgium June 19, 1945

7 Claims. (Cl. 74—501)

The invention refers to automatic adjustment devices for transmission mechanisms and more specially to a device of simple and cheap construction inserted in the transmission connecting a control element to a controlled element, which device corrects automatically any change occurred in the controlled system or in the elements which connect them.

According to the invention, an element, provided in the transmission, connecting the control lever to the controlled system, and put into action by the displacements of said control lever, acts to drive an adjustment element which modifies automatically the length of said transmission, when the importance of the angular displacements of said control lever exceeds a determined value.

Also, to reach this result, it can be obtained that an element, solid with the transmission and axially displaced when said transmission is put into action, be submitted, by means of an appropriate guiding, to an angular movement controlling the rotation of a ratchet wheel, forming so a nut regulating the length of the transmission when the angular displacements of above said element solid with the transmission exceed predetermined limits.

The invention will be better understood by the following more detailed notice with reference to attached drawings in which:

Figures 1 and 2 sketch the cinematic elements of the invention;

Figure 3 sketches the application of the adjustment device to a brake for bicycles with control of the Bowden type;

Figure 4 is a plan view of a modified form in partial section;

Figure 5 is a section along line V—V of Figure 4;

Figures 6, 7, 8 and 9 are transversal sections, respectively along lines VI—VI, VII—VII, VIII—VIII and IX—IX of Figure 5.

Figure 1:
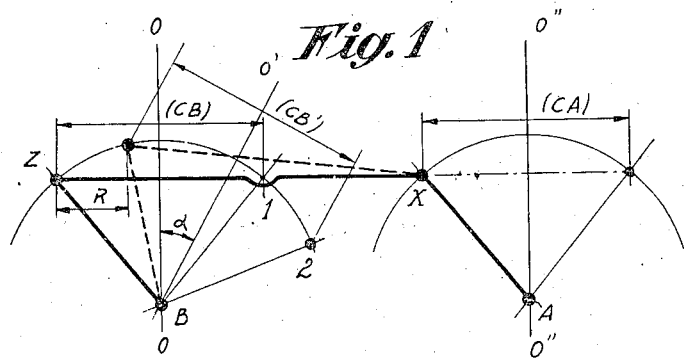

In many mechanical applications constituted by a control system A (Figure 1) with restricted and localized stroke in relation to an axis (stroke CA) and by another controlled system B with restricted stroke (CB or CB') but with variable localization, means must be provided to neutralize the modifications of localization of the controlled organ in order to keep effective the strokes of the control element.

If, for instance, a controlled element B has its active stroke localized from both sides of an axis 00 and if, meanwhile, it moves till it is situated on both sides of axis 0'0, the active stroke of the control element A will become inoperative at a given moment; this eventuality will take place when the control device will act on section 1—2.

To make control organ A again fully effective, it would be feasible to displace its axis C″C″ with an angle equal to α. But, as by definition, the active zone of A is localized on both sides of 0″0″ and the stroke being constant, this solution cannot be retained. Another one will have to be found which will consist in modifying the length of the connecting element ZX, that is to say which will shorten it of a quantity equal to R.

In most of the cases, the angle increases slowly and progressively through time. Consequently, theoretically, the neutralization of the shifting of the active zone of controlled element B should be made progressively and continually.

It is evident that the ideal system would be the one which, at any moment, would modify length ZX according to the variations of angle α.

Such systems can be realized theoretically, but their construction would entail such complications, and consequently such risks of bad operation, that it is preferred to substitute periodic manual adjustments. In these cases, the stroke of the control element A is calculated large enough to allow to record variations corresponding to relatively long periods of use in normal service.

Figure 2:
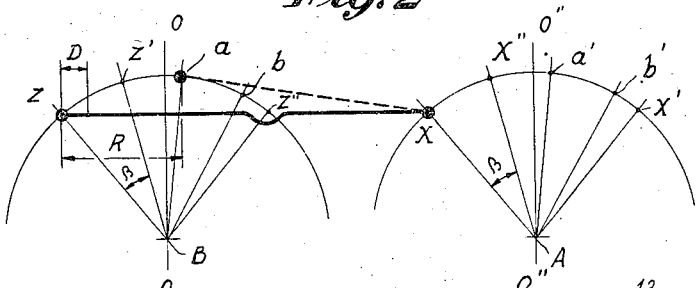

If it is admitted that the normal stroke of the controlled element B and equal to ZZ' (Figure 2), corresponds to an angle β, it must be provided that the total stroke of control element A—XX' be much superior to the normal active stroke ZZ' of controlled element B. The normal operation of the movement is assured as long as the displaced fractional strokes ZZ' remain inside section ZZ″. It is only when Z' will reach Z″ that a regulation will be necessary.

This system offers however the disadvantage of requiring many manual adjustments made which, in many cases, can only be executed by specialists. It offers besides the disadvantage to increase the stroke of control organ A which comprises, from the first wear, a dead stroke followed by the normal work stroke.

That is why the petitioners tried to find a system capable to reduce these adjustments, giving them some automaticity.

The proposed system is applied to one of the control elements of the "movement." It is conceived not to act when the strokes of controlled element B are normal (ZZ'). Its action is only real, that is to say active, when following wear or disadjustment of the one or the other element of the unit, the final action corresponding to the "movement" purpose (XX') would become abnormal, if not corrected.

When the stroke of the control element is normal (XX'), the displacement of that organ does not entail the operation of the device. When, following wear of one of the consecutive parts, stroke X' exceeds its normal value, the device acts automatically and corrects the play. As soon as the latter has been corrected, the device is again inactive till a new play or a new disadjustment appears again.

In other words, the device, wherever placed, will have as its effect to keep unchanged the stroke of control element A in XX'', whatever be the rightwards displacement of controllable element B between Z and Z''.

The proposed system is based on the following principles:

(1) The angle corresponding to the normal active stroke ZZ' of controlled organ B is considered constant (it is the one corresponding to normal operation: purpose of the movement);

(2) The active section ZZ' moves in one direction only between two extreme-points ZZ'' (ZZ'' corresponds to the maxima limits of use of the controlled element, total wear allowed);

(3) The active stroke of control element A must remain constant and be equal to XX'' (XX''=ZZ');

(4) The possible displacement of control element A is kept within limits XX' but the device will strive to bring it always back in zone XX'', zone X''X' being used to regain the play.

Each over extension to the right from spot X'' will automatically cause a shortening of distance ZX;

(5) The automatic shortening system will cease its action, as soon as the stroke of control element A will have been brought back to a value equal to XX'', corresponding angle $\beta$ having been brought back in its first position.

If, for any reason, the active zone ZZ' of controlled element B moves to place itself in $ab$, it is evident that, if no adjustment occurs, control element A will pass from XX'' into $a'b'$.

It is thus necessary that, when point X'' has been crossed, a device shortens rod ZX with a corresponding quantity R. The mathematical realization of this criterion would lead, as we already explained, to exaggerated mechanical complication; that is why the invention realizes a solution which, within the limits of practical use, brings a greatly satisfactory solution to the problem.

Practice shows that the successive rightwards displacements of the active zone ZZ' of controlled element B are slow, compared with the number of activations of the system. The invention is based on that fact to realize a mechanism which will cause the adjustment of the length of rod ZX, not instantaneously but rapidly enough in order that the unit could be considered as a permanent adjustment.

Besides, position X'' has not been considered as the necessary operative position of the device; it was admitted that it could be slightly exceeded, but the petitioners obliged themselves to suppress the exceeding of X'', that is to say to make R=zero within time limits much shorter than those resulting from the practical lengthening of working zone ZZ'.

If Figure 2 is again examined, it is admitted that, following wear of controlled element B, the working stroke ZZ' has passed in $ab$. If nothing occurs, the stroke of control element A has become X$b'$ in which X$a'$ is a dead stroke; this dead stroke X$a'$ being equal to the inoperating action Z$a$ of the controlled element.

Let us admit that each time when control element A exceeds spot X'', a device causes a shortening movement of rod ZX, this shortening having a value equal to D. It is understood that, when a number of actions R/D will have been made, the rod will have been shortened with R and control movement A will have been brought back to the first position and to the value of XX'', what was purported.

Examining things more closely, it will be noticed that, as R grows slowly in the time compared to the number of actions of A, each time the displacement of XZ will have reached a quantity equal to D (which can be very small), the system will enter into action and practically the error will not be capable to exceed the value of D.

It has been said that the whole stroke XX' has been retained to control element A. If, for any reason (disadjustment), the starting point of controlled element B would go suddenly from Z to $a$, control device A would dispose, to meet it momentarily, of that stroke XX' predetermined for that construction.

The invention consists thus in adaptating a special device inserted in any spot between points B and A, passing through Z and X, capable to produce, directly or indirectly the control transmission effect corresponding to a standard length invariable and equal to ZZ', this shortening effect purporting to correct automatically, in the control system, any modification occurred in the controlled system or in the organs connecting them. The action of the device has thus for result to bring automatically the action of the control back to its first value and position, whatever be the wear or other disarrangement occurred in the controlled elements or in the intermediary pieces.

The preceding description is a principle explanation.

The above mentioned device is apt to be applied to any whatsoever mechanical movements constituted in principle by:

(1) A movable mechanism receiving a strain;

(2) A movable mechanism transmitting that strain;

(3) A movable mechanism receiving and using for any purpose the strain transmitted through the mechanism mentioned under (2).

It is to be noted that the device, object of the invention, can be fastened on one of the three above mentioned mechanisms.

Figure 3:
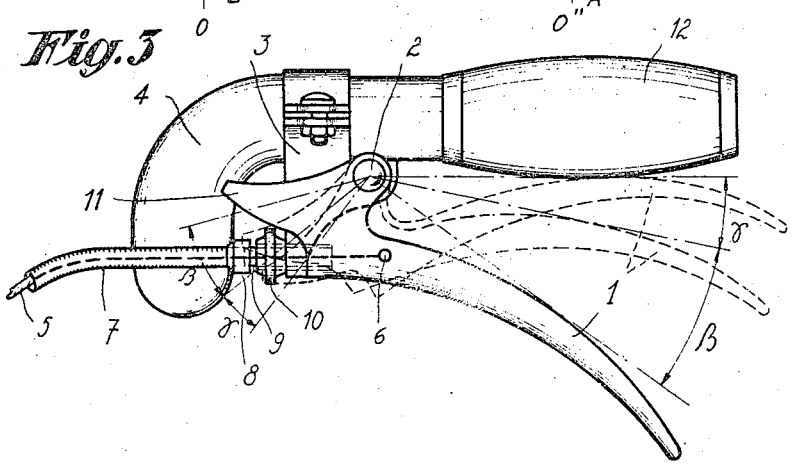

In Figure 3 of the drawings, is shown a realization method of the invention applied, in view to obtain the automatic draw back of the play or of the deregulation, to a cable brake of the "Bowden" type for bicycle or motorcycle.

Be it brakes on felly through tightening blocks or jaw brakes on drums mounted on axles, on front wheel, on back wheel or on both wheels, the automatic regulation device has as result to correct automatically any working abnormality resulting from wear or disadjustment.

The draw back of the play resulting from wear or disadjustment, will occur at the moment of the first brakings by the simple and normal action of the handle (grip) of the brake. If the wear is slight, one movement of the grip, that is to say one single braking, will be sufficient to bring the unit back to ideal operation conditions. If the play is considerable (owing to disadjustment), it will suffice to actuate consecutively the handle several times to draw back the totality of the play.

Brake control element 1 articulated in 2 to a support 3, fastened to the handle-bar 4, transmits the movements through a flexible cable 5 fastened in 6 by one of its extremities and sliding in a sheath 7, both extremities of this sheath forming an abutment.

To brake, cable 5 is shortened by rotative action of element 1 forming handle.

To take up a play, it is necessary either to shorten cable 5 or to increase the distance between the two stops by lengthening of sheath 7.

At the end, handle side, sheath 7 rests upon head 8 of a hollow screw 9 gliding in an opening provided at support 3. On that screw 9 is fastened a small toothed wheel 10, preferably with ratchet teeth, forming nut reacting on said support.

An automatic locking system of wheel 10, through click or spring (not shown) can be provided to prevent any untimely rotation of said wheel.

Handle 1 bears a nib 11. At each braking movement handle 1 will entail nib 11 in a rotation movement downwards around axis 2.

If the whole brake unit operates normally, the cable is stretched, the brake elements act without nib 11 contacting with toothed wheel 10 (this normal operation corresponds to an angle β).

If wear or disadjustment have occurred since the preceding braking, the active angle of the handle increases and becomes β+γ. Handle 1 is brought nearer to grip 12 of the handle-bar and nib 11 lowers till coming to act on the teeth of toothed wheel 10 communicating to the latter a downward rotation movement. This rotation of toothed wheel 10 causes a longitudinal displacement of screw 9 which advances leftwards. By this displacement, screw 9 pushes back sheath 7, which corresponds to a lengthening of the latter and to the correction of play and disadjustment.

The device can be realized such as described above, but it can also be made to operate in opposite direction, that is to say when handle 1 goes away from the grip of the handle-bar, or in other words during the back stroke of this handle.

The same device applied here to the handle-bar, can be applied on any other point of the brake mechanism. It could, for instance, be adapted directly on the sheath or on the rod substituting the cable and its sheath.

The example which has just been described applies a translation movement in view to modify automatically the length of the transmission starting from a pre-determined angular displacement of the control lever. It is possible to apply the device of the invention by substituting to said translation movement an angular control movement in order to realize an extremely compact equipment similar to the rotating handle. Such an execution is sketched on attached Figures 4 and 9.

As shown on these different figures, a flexible cable 13, connecting the control lever to the controlled device, is guided in a sheath 14 which is interrupted on a section of its length and replaced by the mechanism, according to the invention.

This mechanism comprises a cylindrical peg 15, provided with an axial opening in which runs the cable on which is fastened said peg by means of a radial screw 16. This screw presents a cylindrical part 17 which extends outside peg 15 and on which pivots a roller 18.

Peg 15 slides in a socket 19 provided, on its whole length, with a straight groove 20, parallel to the axis of cable 15, in which slides roller 18.

A second socket 21, centered on socket 19, bears a milled groove 22, in which roller 18 is guided, said groove presenting a straight part parallel to the axis of the socket followed by a sloped part 23 (Figures 4 and 7).

A cylindrical casing 25, surrounding socket 21, is fastened on the latter by means, for instance, of a setting 26 engaged in an outside gullet of said socket. This casing forms a protection case enclosing the whole device so as to make it watertight and to protect it against dust, mud, etc.

Looking at Figure 5, the edge of a cup 27 engaged in the hollow of the socket comes to rest on the right end of socket 21. In the inside bottom of this cup is abutted one of the ends of the interrupted part of sheath 14, whilst on its outside bottom comes to rest socket 19. This cup is provided with a central opening 28, through which passes cable 15.

A hollow screw 29, through which passes and moves cable 13, is abutted on the left against sheath 14 which is engaged in a widened part 30 of this screw whose edges slide in a contracted cylindrical part 31 of sheath 25. Screw 29 bears at its right end a spur 32, protruding therefrom and forming a wedge in the longitudinal groove 20.

A ratchet wheel 32, forming nut, is screwed on hollow screw 29 and reacts on one side on said screw and on the other side on socket 19.

A spring-blade 34, fastened to socket 21 and engaging by its free end the ratchets of wheel 33 forms a spring-pawl for driving the latter. A second spring-blade 35, fastened to socket 19 and engaging also by its free end the ratchets of wheel 33 forms a stopping peg for said wheel.

When the device operates, cable 13, controlled by the handle or the pedal, moves from left to right and, if the amplitude of the movement is normal, that is to say, if it corresponds to the normal operation and braking stroke, the device does not act. In fact, the cable drives peg 15 rightwards and its roller 18 moves in groove 20 of socket 21. The displacement being normal, roller 18 does not go beyond the right part of groove 22 and contacts at the utmost with the sloped part formed at the beginning of this groove. The braking is made, after which all the elements of the device come back to their previous place.

If, owing to wear or disadjustment, the braking action needs a longitudinal displacement of the cable, above to the normal, roller 18 describes a higher stroke and enters into sloped part 23 of the groove. As roller 18 can move only parallelly to the axis of the cable, because of its dependence from right groove 20 of socket 19, as soon as it enters into sloped groove 23, it causes a rotation movement of said socket 21, whose amplitude is proportional to the length travelled by said roller in said sloped groove. This rotation of socket 21 is expressed, under action of spring click 34, which is solid with it, by an equivalent rotation of toothed wheel 33. When the width of the angular displacement of said toothed wheel exceeds a determined value, stop click 35, solid with socket 19 will come to fit into the tooth following the one in which it was fitted. In the meantime, the rotation of wheel 33 having caused a proportional displacement of screw 29, sheath 14 has been pushed back to the left and has realized the desired take up of the play. During the back stroke of cable 13, all the elements return to their first position, except sheath 14, screw 29 and toothed wheel 33. The latter being strongly maintained in its new position by means of stop click 25, driving click 34, driven by the return movement of socket 21, will fit itself in the following tooth.

The device according to the invention can be placed at any place of the transmission without necessitating a cutting of the cable.

It is also possible to realize its mounting on one or on the other end of the transmission by suppressing either the left part or the right part of the sheath. In the case of a control mechanism, transmitting its power without using a sheath (be it a cable or a rod) the device can be applied by means of the necessary attachments.

The device can operate either in its forward movement (against the braking), as described above, or in its return movement.

What we claim is:

1. Device for automatically adjusting vehicle brakes having a compensator and actuated by a sheathed cable, a slider secured to the cable and adapted to move therewith, concentric cylindrical sockets, one of which has a rectilinear slot and the other a non-rectilinear slot, and an element on the slider extending through both of the sockets slots, whereby the longitudinal displacement of the cable-driven slider will cause rotation of the socket with non-rectilinear slot and actuation of the compensator to which said socket is connected.

2. Automatic brake adjustment device for brakes actuated by a cable in a flexible sheath, comprising a slider secured to the cable, a pair of concentric cylindrical sockets surrounding the cable, one of which has a longitudinal aperture and the other an helicoidal one, a roller on the slider extending through the apertures of both sockets, and a threaded ring connected to the longitudinally apertured socket against which rests one end of the flexible sheath.

3. Automatic brake adjusting device for brakes actuated by a cable in a flexible sheath, comprising a slider secured to the cable, a pair of concentric sockets surrounding the cable, one of which has a longitudinal aperture and the other a helicoidal one, a roller on the slider extending through the apertures of both sockets, a threaded ring adapted to be displaced by the longitudinally-apertured socket, and a ratchet between said ring and socket, whereby rotation of the longitudinally-apertured socket displaces one end of the cable sheath.

4. Automatic brake-adjusting device for brakes actuated by a cable in a flexible sheath, comprising a slider secured to the cable, a pair of concentric sockets the first of which has a longitudinal aperture and the other a helicoidal aperture, a roller on the slider extending through the apertures of both sockets, for rotating the first socket when the cable is displaced, a threaded ring adapted to bear against one end of the sheath, and a ratchet device between the ring and first socket, whereby said ring is actuated only after a minimum predetermined travel of the slider.

5. In brake-adjusting means for brakes actuated by a cable in a flexible sheath, a guide at one end of said sheath for guiding same longitudinally against rotation, a threaded sleeve against which the sheath guide bears, a slider secured to the cable, a pair of concentric cylindrical sockets the first of which has a longitudinal slot and the second a helicoidal slot, a roller on the slider engaging both slots, whereby the first socket is moved when the cable is pulled, a threaded ring adapted to bear against one end of the sheath, and a ratchet between said first socket and ring for moving the said ring.

6. Automatic adjustment device for brakes actuated by a cable in a flexible sheath, comprising a slider secured to the cable, a pair of concentric cylindrical sockets the first of which has a longitudinal slot and the second a helicoidal slot, a roller on the slider extending through both slots, a tube one end of which acts a stop for one end of the sheath and the other end is guided longitudinally, a ring threaded onto the tube, and a ratchet device actuated by the first socket and adapted to move the ring, whereby the guided end of the sheath is displaced longitudinally in accordance with movements of the cable.

7. In a device as claimed in claim 6, a sleeve enclosing the entire mechanism and through which said mechanism the cable extends longitudinally.

GASTON BODINAUX.
ARMAND MALCHAIR.

REFERENCES CITED

The following references are of record in the file of this patent:

UNITED STATES PATENTS

| Number | Name | Date |
|---|---|---|
| 1,727,741 | Athimon | Sept. 10, 1929 |
| 1,847,716 | Hallot | Mar. 1, 1932 |
| 2,079,662 | Pooley | May 11, 1937 |